June 29, 1965 J. J. RODRIGUES, JR 3,191,807
DISPENSER ADAPTED FOR ULTRA-MICRO RANGE
Filed Nov. 13, 1961 2 Sheets-Sheet 1

INVENTOR.
JOHN J. RODRIGUES, JR.
BY
Bruce & Brosler
HIS ATTORNEYS

June 29, 1965 J. J. RODRIGUES, JR 3,191,807
DISPENSER ADAPTED FOR ULTRA-MICRO RANGE
Filed Nov. 13, 1961 2 Sheets-Sheet 2

INVENTOR.
JOHN J. RODRIGUES, JR.
BY
HIS ATTORNEYS

United States Patent Office 3,191,807
Patented June 29, 1965

3,191,807
DISPENSER ADAPTED FOR ULTRA-MICRO RANGE
John J. Rodrigues, Jr., Berkeley, Calif., assignor to Microchemical Specialties Co., Berkeley, Calif., a corporation of California
Filed Nov. 13, 1961, Ser. No. 151,873
9 Claims. (Cl. 222—49)

My invention relates generally to the dispensing of liquids in equal volumes, and more particularly to the dispensing of equal aliquots of liquid, primarily in the ultra-micro range.

Dispensers for dispensing liquids in equal volumes are well known. In such dispensers however, the quantity of liquid dispensed per discharge is so large compared to a single drop of such liquid, that a variation of one drop or so from one discharge to the other is of no particular moment.

However, when it comes to operating in the ultra-micro range where the volume of liquid to be discharged at any one time corresponds to but a single drop or fraction thereof, it becomes apparent that variations in the quantity of liquid discharged from the device cannot be tolerated.

Not only must such dispenser function with supreme accuracy in measuring out the minute quantity to be dispensed, but in dealing with quantities of such small magnitude as a drop, such minute quantity does not flow from the end of the discharge nozzle, but adheres thereto and must be picked off. Consequently any reduction in the pressure within the dispensing system, following the formation of such drop, can result in a portion thereof being sucked back into the system, resulting in error in the quantity of liquid picked off.

Among the objects of the present invention are:

(1) To provide a novel and improved liquid dispenser capable of dispensing equal parts of liquid, and particularly in the ultra-micro range;

(2) To provide a novel and improved liquid dispenser adapted for use in the ultra-micro range, and one which may be installed in a portable container from which liquid is to be dispensed, or which may be employed for dispensing such liquid from a connected reservoir;

(3) To provide a novel and improved liquid displacing means for a dispenser capable of being designed for use in the dispensing of liquid in the ultra-micro range;

(4) To provide a novel and improved valve assembly adapted to function in a liquid dispenser for the dispensing of equal quantities of liquid in the ultra-micro range;

(5) To provide in a liquid dispenser, novel and improved means for accurately presetting such dispenser to discharge volumes of desired quantities, and which means is applicable to dispensers functioning in the ultra-micro range.

These and other objects and advantages will be further apparent from the following description and the accompanying drawings, which illustrate two preferred embodiments of the invention as applied to a portable dispenser for liquids.

Figure 1:
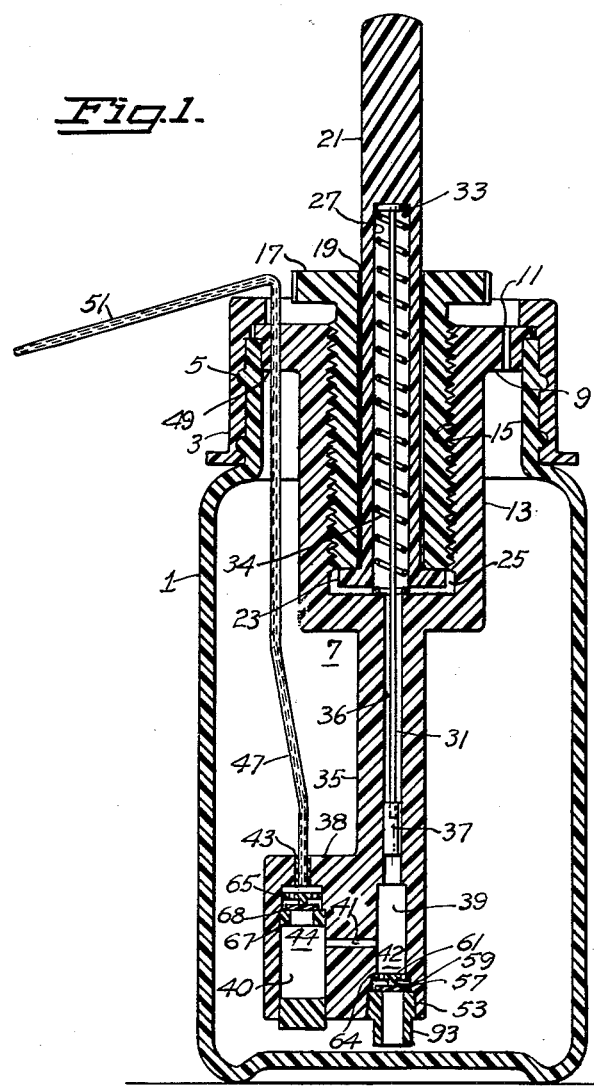
FIGURE 1 is a vertical sectional view of a dispenser utilizing a fitted adjustable stroke piston for altering the volume of the metering chamber to dispense a predetermined quantity of liquid.
Figure 4:
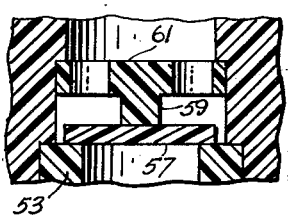
FIGURE 4 is an enlarged view in section of a valve assembly forming a vital part of the aforementioned dispensers.
Figure 2:
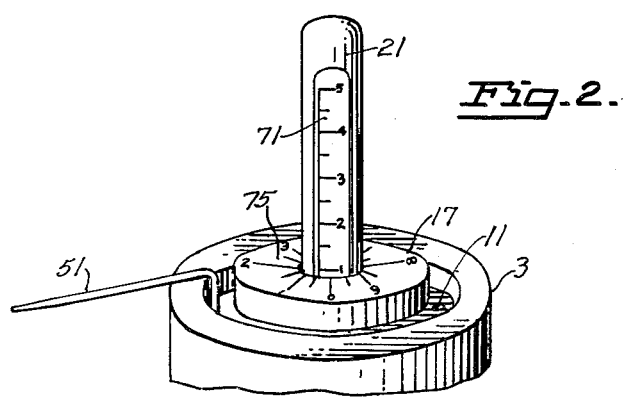
FIGURE 2 is a top perspective view of the dispenser of FIGURE 1, showing an arrangement of cooperating scales for establishing an adjustment of the piston stroke in the dispenser.

Referring now to the drawings and particularly to FIGURE 1, the invention may be employed for the dispensing of liquid from a jar or container 1, provided with a removable cap ring 3, secured as by threads 5 to the neck of the container. Projecting downwardly into the container 1 is a body 7 with a radial supporting shouldered flange 9, clamped to the top of the jar by cap ring 3, and having a vent 11 exposing the interior of the jar 1 to the atmosphere. The upper end 13 of body 7 is enlarged and provided with an internally threaded recess 15 to accommodate a coaxial bushing 17 having a central bore 19 to receive and guide a reciprocable plunger 21.

The lower end of the plunger 21 terminates in a radial flange 23 of somewhat less diameter than the bushing 17 so that the same may be reciprocated to an extent determined by the spacing 25 between the lower end of bushing 17 and the bottom of the threaded recess 15. Such spacing may be altered by adjusting the bushing 17 in its recess 15.

Plunger 21 is formed with a longitudinal bore 27 to receive a piston rod 31 having a head 33 against which one end of a compression spring 34 bears, while its other end engages the lower end of the recess 15, whereby the plunger and rod are normally urged resiliently outwardly with respect to body 7.

The lower portion 35 of body 7 is preferably of smaller diameter and has a cylindrical bore 36 to receive a closely fitted or lapped piston 37 at the bottom end of rod 31, the body 7 then terminating in an enlargement 38 formed to provide an intake chamber 39 below the piston, and a discharge chamber 40 in proximity thereto, the two chambers being flow connected by a communicating passage 41.

The intake chamber is exposable at its lower end to the interior of the container 1, at which point it is normally closed by a valve assembly 42, while the discharge chamber is provided with a discharge passage 43 normally blocked by a similar valve assembly 44. Such discharge valve assembly permits flow under pressure to a discharge tube 47 of small bore which at one end is anchored in the discharge passage 43 and extends upwardly out of the container 1 via a hole 49 in flange 9, and preferably terminates in a sharp bend to form a discharge nozzle 51.

The intake valve assembly 42 involves a bushing 53 inserted into the lower end of the chamber 39 and providing a valve seat for a unique valve, comprising a flexible disc 57 of any suitable resilient elastomer resting on the valve seat to block the intake passageway through the bushing 53, said disc having a centralized valve stem 59 terminating in a perforated disc-shaped head 61. The valve is confined under a very light pressure approaching zero pressure, between the bushing 53 and a shoulder 64 in the chamber wall, and accordingly can respond to outside pressure of liquid, only by flexing peripheral portion of the valve disc 57 away from the valve seat, to permit inflow of liquid into the chamber 39. Such type of valve has been found to be so sensitive to any differential pressure developed thereacross as when initiating an intake stroke of the piston, that inflow of liquid will occur in precise synchronism with such movement of the piston.

By the same token, cut-off of such inflow of liquid occurs instantaneously and in synchronism with completion of the intake stroke of the piston. No time delay is perceptible in either instance and this is significant in accomplishing the objects of the present invention for it assures that the liquid intake per stroke will exactly replace that which is lost through discharge.

The valve assembly 44, involves a valve 65 of similar construction to valve 57, this valve being likewise confined, but between the upper end of the discharge chamber and a bushing 67 installed in the chamber against a shoulder 68 in the chamber wall, the bushing 67 providing a seat for the valve.

In the operation of the dispenser, both chambers 39, 40, and dispensing tube 47 are completely filled with liquid, which can be accomplished by a few reciprocations of the plunger 21. Following this, each down stroke of the plunger will cause a discharge from the nozzle 51, of an amount of liquid exactly equal to the volume displaced by the piston 37 in its resulting downward travel.

Such volume is a function of piston diameter and stroke, and by limiting these, the volume dispensed may be caused to be in the ultra-micro-range. With this embodiment, adjustments may be conveniently made by altering the permissible stroke of the piston, as by rotating the bushing 17 in one direction or the other. On the return stroke, the liquid will be replenished by an amount exactly equal to that discharged from the dispensing tube 47.

Inasmuch as such minute quantity of liquid as a drop or fraction thereof, may be dispensed at each stroke from a full charge of considerably greater volume, conditions at each stroke will be identical, and consequently the minute quantity discharged at each stroke will be identical.

From a functional viewpoint, the intake chamber and discharge chamber with the connecting passageway are the equivalent of a single chamber and actually constitute a single chamber.

To predetermine the magnitude of discharge, the dispenser may be calibrated, and this may be realized by applying a suitable main scale 71 on the exposed portion of the plunger 21, the surface of which may be flattened on one side for the purpose. This scale preferably increases in magnitude as one approaches the upper end of the plunger.

In utilizing the scale, the plunger is depressed as far as it can go, and while held in this position, the bushing 17 is adjusted until the upper surface thereof registers with the desired marking on the scale. This presets the dispenser to dispense that quantity per stroke of the plnuger.

Figure 3:
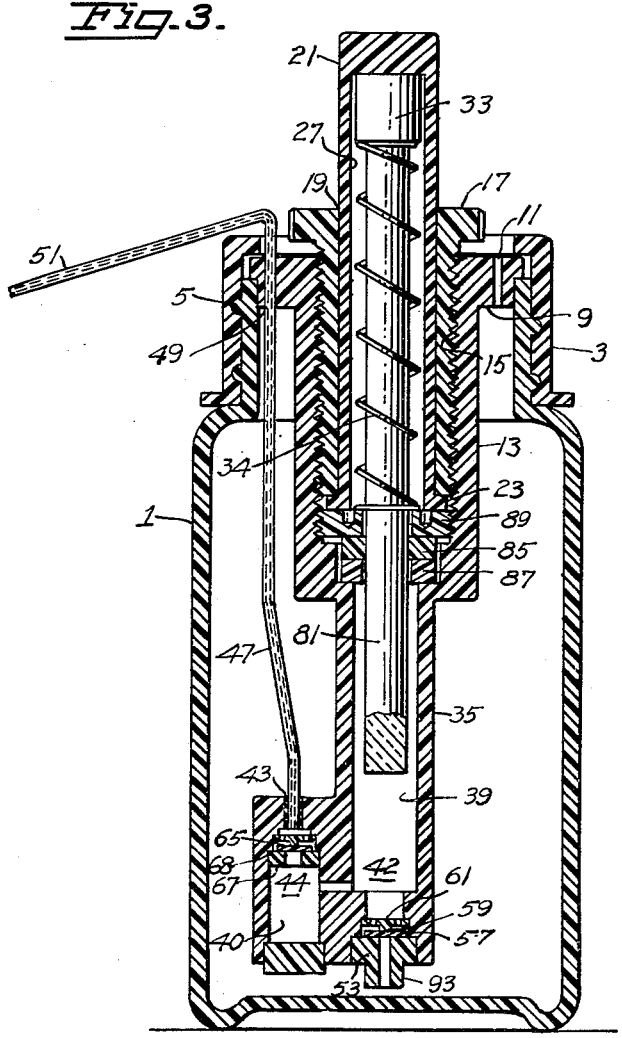
FIGURE 3 is a vertical sectional view of an alternative form of dispenser utilizing a displacement rod for altering the volume of the metering chamber by small, accurately controlled increments.

To more accurately adjust the dispenser, there is provided for use with the main scale 71, a vernier scale 75, which may be inscribed or otherwise applied to the head of the bushing surrounding the plunger. When thus calibrated, the dispenser may be quickly adjusted to dispense any volume within its range of capability, with assurance of accurate results. Referring now to FIGURE 3, which shows an alternative arrangement of liquid displacing means to that just described, similar reference numerals designate similar parts.

The principal difference lies in the provision of a rod 81 in lieu of the piston 37 of FIGURE 1, the rod being of a diameter substantially less than the interior of the body 7 in which it is adapted for reciprocation, and accordingly may be designated a free piston. It passes into the narrow portion 35 of the body through a resilient close fitting sealing washer 85 of any suitable elastomer, one such elastomer being a plastic known as "KEL-F" elastomer. This washer is clamped between a back-up washer 87 below and a retainer 89 above, to preclude deflection of the sealing washer 85 with movements of the free piston, to thereby minimize leakage and error. The retainer 89 may be peripherally threaded and urged into clamping position by providing same with spanner wrench recesses.

With this construction, the quantity of liquid dispensed per stroke will equal the change in piston volume exposed below the washer 85 during a discharge stroke.

Through the substitution of free pistons of different diameters, and a change to appropriate sealing washer 85 and associate back-up washer 87 and retainer 89, the range of the dispenser may be altered, and with such change, a new scale should be available. Such scales may be provided on interchangeable plungers 21.

The rods which function as the free pistons, will be precisely calibrated as to diameter. The larger the diameter, the shorter the stroke necessary to dispense a predetermined quantity. Consequently, the various free pistons capable of use in the one dispenser will be designed so as to permit of the desired accuracy without constructing the overall device excessively high.

By the same token, once the stroke range has been determined, the discharge volume capacity can be altered by changing the piston diameter only.

To enable the syringe portion of either dispenser, to be employed in dispensing liquid from a remote reservoir, in lieu of the jar 1, the bushing 53 is formed with an extended end 93 for the coupling thereto of a hose. Thus, by removing the syringe portion from the jar, and coupling to the bushing 53, a hose leading from a reservoir, liquid may be dispensed from such reservoir.

The ability of the foregoing devices to function in the ultra-micro range is thus made possible by the cooperative action of (1) the piston and associated means for ascertaining and assuring precise stroke control, and (2) the extremely sensitive valve assemblies described, the first assuring identity of volume displaced during each stroke while the latter blocks return of any displaced liquid while assuring replacement thereof with an identical quantity.

It will be apparent to one skilled in this art, that great latitude in selection of materials is permitted in the construction of this improved dispenser, just so that they will be unaffected by the specific liquids to be dispensed. Metals, glass and numerous types of moldable plastics, are available for this purpose.

Also, while the invention is directed particular to the dispensing of equal quantities of liquid in extremely small volumes, the same may be employed in dispensers for larger volumes, while the reverse would not be true for dispensers of the prior art.

I accordingly do not desire to be limited in my protection to the specific details or materials illustrated and described except as may be necessitated by the appended claims.

I claim:

1. Liquid dispensing means comprising, a syringe body having a longitudinal passageway for a piston assembly, and including an enlarged recess at its upper end, said passageway leading to an intake-discharge chamber, an intake valve assembly controlling flow into said chamber and a discharge valve assembly controlling flow from said chamber, a piston assembly in said passageway with a piston adapted to alter the effective volume of said intake-discharge chamber during reciprocation thereof, means for adjustably controlling the stroke of said piston assembly, said means including a plunger having a recessed end adapted to receive one end of said piston assembly, said plunger having a flange at the recessed end, a spring in said plunger normally urging said piston assembly into said plunger to the extent permitted by said plunger, and a bushing adjustably assembled into said body recess to create a well defined limiting space between the bottom of said recess and the bottom of said bushing within which said plunger flange may move, and means for presetting said bushing to determine permissible stroke of said piston assembly, said means including a scale on said plunger and a vernier scale on the upper end of said bushing surrounding said plunger.

2. Liquid dispensing means comprising, a syringe body having a longitudinal passageway for a piston assembly, and including an enlarged recess at its upper end, said passageway leading to an intake-discharge chamber, an intake valve assembly controlling flow into said chamber and a discharge valve assembly controlling flow from said chamber, each such valve assembly comprising a valve seat, a valve normally seating on said valve seat including a disk of an elastomer material and provided with a centralized valve stem terminating in a perforated disk shaped head, means for restricting movement of said valve as a unit while leaving the peripheral portion of said disk free to flex, a piston assembly in said passageway with a piston adapted to alter the effective volume of said intake-discharge chamber during reciprocation thereof, means for adjustably controlling the stroke of said piston assembly, said means including a plunger having a recessed end adapted to receive one end of said piston assembly, said plunger having a flange at the recessed end, a spring in said plunger normally urging said piston assembly into said plunger to the extent permitted by said plunger, and a bushing adjustably assembled into said recess to create a well defined limiting space between the bottom of said threaded recess and the bottom of said bushing within which said plunger flange may move, and means for presetting said bushing to determine permissible stroke of said piston assembly.

3. Liquid dispensing means comprising, a syringe body having a longitudinal passageway for a piston assembly, and including an enlarged recess at its upper end, said passageway leading to an intake-discharge chamber, an intake valve assembly controlling flow into said chamber and a discharge valve assembly controlling flow from said chamber, each such valve assembly comprising a bushing providing a valve seat, a valve normally seating on said valve seat including a disk of an elastomer material and provided with a centralized valve stem terminating in a perforated disk shaped head, means restricting said valve against movement as a unit while leaving the peripheral portion of said disk free to flex, a piston assembly in said passageway with a piston adapted to alter the effective volume of said intake-discharge chamber during reciprocation thereof, means for adjustably controlling the stroke of said piston assembly, said means including a plunger having a recessed end adapted to receive one end of said piston assembly, said plunger having a flange at the recessed end, a spring in said plunger normally urging said piston assembly into said plunger to the extent permitted by said plunger, and a bushing adjustably assembled into said recess to create a well defined limiting space between the bottom of said recess and the bottom of said bushing within which said plunger flange may move, and means for presetting said bushing to determine permissible stroke of said piston assembly, said means including a scale on said plunger and intersected by the upper end of said bushing.

4. Liquid dispensing means comprising, a syringe body having a longitudinal passageway for a piston assembly, and including an enlarged threaded recess at its upper end, said passageway leading to an intake-discharge chamber, an intake valve assembly controlling flow into said chamber and a discharge valve assembly controlling flow from said chamber, each such valve assembly comprising a bushing providing a valve seat, a valve normally seating on said valve seat including a disk of an elastomer material and provided with a centralized valve stem terminating in a perforated disk shaped head, means restricting said valve against movement as a unit while leaving the peripheral portion of said disk free to flex, a piston assembly in said passageway with a piston adapted to alter the effective volume of said intake-discharge chamber during reciprocation thereof, means for adjustably controlling the stroke of said piston assembly, said means including a plunger having a recessed end adapted to receive one end of said piston assembly, said plunger having a flange at the recessed end, a spring in said plunger normally urging said piston assembly into said plunger to the extent permitted by said plunger, and a bushing adjustably threaded into said recess to create a well defined limiting space between the bottom of said threaded recess and the bottom of said bushing within which said plunger flange may move, and means for presetting said bushing to determine permissible stroke of said piston assembly, said means including a scale on said plunger and a vernier scale on the upper end of said bushing surrounding said plunger.

5. In a liquid dispenser having a longitudinal passageway for a piston assembly, and a plunger type piston assembly in said passageway; means for adjustably controlling the stroke of said plunger type piston assembly, said means including a scale carried longitudinally of said plunger type piston assembly and movable therewith, said scale having values increasing toward the upper end of said piston assembly, stop means in said dispenser for limiting downward movement of said plunger type piston assembly to fix the downward limit of each stroke, and a bushing surrounding said plunger type piston assembly, said bushing being adjustably assembled into said dispenser with respect to said fixed stop, to create an adjustable upper stop for said plunger type piston assembly and to alter the upper limit of the stroke thereof, said adjustable bushing in conjunction with said stop means and said scale providing means for predetermining the stroke of said plunger type piston assembly.

6. In a liquid dispenser having a longitudinal passageway for a piston assembly, and a plunger type piston assembly in said passageway; means for adjustably controlling the stroke of said plunger type piston assembly, said means including a plunger, means for maintaining said plunger type piston assembly in substantially unitary assembly with said plunger, stop means in said dispenser in the path of downward movement of said plunger to limit downward movement of said piston assembly to fix the downward limit of each stroke, and a bushing surrounding said plunger and adjustably assembled into said dispenser with respect to said fixed stop, to create a well defined limiting space between said stop means and the bottom of said bushing for limiting movement of said plunger, said limiting space being alterable by adjustment of said bushing to permit of change in said limited movement of said plunger, and means for presetting said bushing to predetermine permissible stroke of said piston assembly.

7. In a liquid dispenser having a longitudinal passageway for a piston assembly, and a piston assembly in said passageway; means for adjustably controlling the stroke of said piston assembly, said means including a plunger having a recessed end adapted to receive one end of said piston assembly, spring means normally urging said piston assembly into said plunger, stop means in said dispenser in the path of downward movement of said plunger to limit such downward movement, and a bushing surrounding said plunger and adjustably assembled into said dispenser to create a well defined limiting space between said stop means and the bottom of said bushing for limiting movement of said plunger, and means for presetting said bushing to alter said limiting space to predetermine permissible stroke of said piston assembly.

8. In a liquid dispenser having a longitudinal passageway for a piston assembly, and a piston assembly in said passageway; means for adjustably controlling the stroke of said piston assembly, said means including a plunger having a recessed end adapted to receive one end of said piston assembly, spring means normally urging said piston assembly into said plunger, stop means in said dispenser in the path of downward movement of said plunger to limit such downward movement, and a bushing surrounding said plunger and adjustably assembled into said dispenser to create a well defined limiting space between said stop means and the bottom of said bushing for limiting movement of said plunger, and means for presetting said bushing to predetermine permissible stroke of said piston assembly, said means including a main scale along said plunger and a vernier scale on the upper surface of said bushing and about said plunger.

9. Liquid dispensing means adapted for dispensing liquid within the ultra-micro range comprising a syringe body having a longitudinal passageway leading to an intake-discharge chamber, said passageway including a sealing washer transverse thereof, a piston assembly slidably mounted in said passageway and having a stroke displacement such as to require a plurality of reciprocations of the same to fill said intake-discharge chamber, whereby for each stroke of said piston assembly, only a minor portion of liquid in said chamber can be dispensed, said piston assembly including a rod slidably passing through said sealing washer, and into said intake-discharge chamber in spaced relationship to the walls of said chamber, and means for reciprocating said rod to effect a discharge from said intake-discharge chamber equal to the increase in volume of said rod entering said chamber.

References Cited by the Examiner

UNITED STATES PATENTS

| | | | |
|---|---|---|---|
| 1,189,191 | 6/16 | Charrion | 224—17 |
| 1,406,504 | 2/22 | Simmons | 222—309 |
| 1,467,157 | 9/23 | Hayden et al. | 222—385 |
| 1,486,656 | 3/24 | Green | 222—309 |
| 1,641,280 | 9/27 | Joslin et al. | 222—309 X |
| 1,809,813 | 6/31 | Kantor | 222—309 |
| 2,205,875 | 6/40 | Coffey et al. | 222—309 |
| 2,660,342 | 11/53 | Ruf | 222—309 |
| 2,913,000 | 11/59 | Roberts | 137—525 |

FOREIGN PATENTS

| | | |
|---|---|---|
| 292,495 | 1/32 | Italy. |

RAPHAEL M. LUPO, *Primary Examiner.*

LOUIS J. DEMBO, *Examiner.*